United States Patent [19]

Andō

[11] Patent Number: 4,521,680
[45] Date of Patent: Jun. 4, 1985

[54] SYSTEM FOR FOCUSING A LIGHT BEAM ON A LIGHT REFLECTING SURFACE

[75] Inventor: Hideo Andō, Tokyo, Japan

[73] Assignee: Tokyo Shibaura Denki Kabushiki Kaisha, Kawasaki, Japan

[21] Appl. No.: 399,873

[22] Filed: Jul. 19, 1982

[30] Foreign Application Priority Data

Jul. 20, 1981 [JP] Japan ............................ 56-113245
Sep. 17, 1981 [JP] Japan ............................ 56-146540

[51] Int. Cl.³ .......................... G01J 1/36; G11B 7/00
[52] U.S. Cl. .............................. 250/201; 369/45
[58] Field of Search ............. 250/201 DF; 369/44, 369/45, 46, 111, 112; 358/342

[56] References Cited

U.S. PATENT DOCUMENTS

| 3,969,576 | 7/1976 | Boonstra et al. | 250/201 DF X |
| 4,079,248 | 3/1978 | Lehureau et al. | |
| 4,097,730 | 6/1978 | Korpel | 250/201 DF |
| 4,422,168 | 12/1983 | Ito et al. | 369/45 |

Primary Examiner—Edward P. Westin
Attorney, Agent, or Firm—Cushman, Darby & Cushman

[57] ABSTRACT

An optical head of the present invention is provided with an optical system including an objective lens, and a photodetector. A laser beam incident on the objective lens is converged thereby and projected on a light-reflecting layer. The laser beam reflected by the light-reflecting layer is transferred to a light receiving surface of the photodetector through the optical system including the objective lens. The light receiving surface includes two photosensitive regions and a photoinsensitive region arranged between the two photosensitive regions and detecting no substantial light rays. While the objective lens is kept in the just focusing state, most of light rays are projected on the photoinsensitive region, and low level current is generated from the photodetector. If the objective lens is in defocusing state, the laser beam is projected toward one of the photosensitive regions, and a high level current is generated from the photodetector.

13 Claims, 24 Drawing Figures

F I G. 8
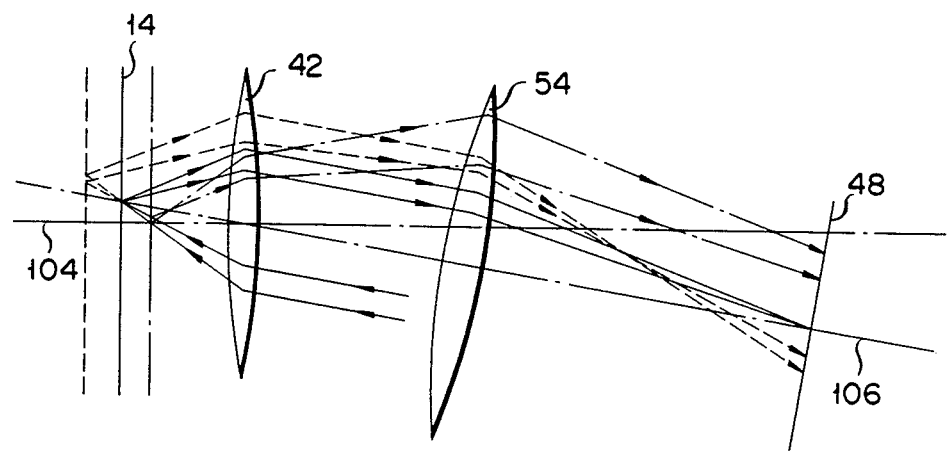
F I G. 10
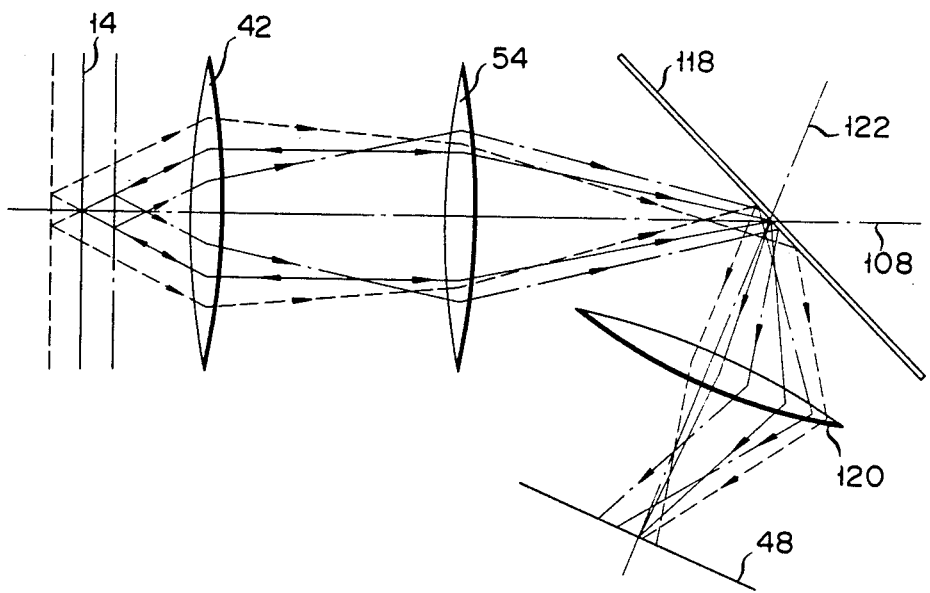

SYSTEM FOR FOCUSING A LIGHT BEAM ON A LIGHT REFLECTING SURFACE

BACKGROUND OF THE INVENTION

The present invention relates to an optical system for reading from and/or writing information on an information recording and/or reproducing medium such as an optical disk and, more particularly, to an optical head for projecting a laser beam onto an information recording and/or reproducing medium to read from and write information on it.

In an optical system which reads out from or writes information on an information recording and/or reproducing medium, a laser beam is projected onto the information recording and/or reproducing medium (to be referred to as an optical disk hereinafter) through an optical head. The laser beam reflected from the optical disk is picked up by the optical head. In order to write information on the optical disk and to properly read it out, the focal point of an objective lens of the optical head must be accurately placed on the light reflecting surface of the optical disk. In other words, the beam waist of the laser beam converged by the objective lens must be projected onto the optical disk. Various apparatuses have been developed to detect the defocusing state or out of focus state of the objective lens. However, none of them is satisfactory. For example, an apparatus which utilizes the difference between sizes of focused and defocused beam spots on the optical disk has been proposed wherein different patterns of the focused and defocused beam spots are projected onto a photodetector and are detected by the photodetector to achieve proper focusing. Further, an apparatus for focusing a laser beam, which is provided with a lens system combining a convex lens and a cylindrical lens is disclosed in U.S. Pat. No. 4,079,247 of Bricot et al. In these apparatuses, if minute recesses or projections are formed on the optical disk, a diffraction pattern is formed in the beam spot pattern on the photodetector, resulting in erroneous operation. Especially, in an optical disk which has a tracking guide to increase information recording capacity, a diffraction pattern of the tracking guide is formed in the beam spot pattern on the photodetector when the beam spot is formed on the tracking guide. As a result, the apparatus may be erroneously operated.

In the apparatus described above, the defocusing state of the objective lens is detected by changes in the size of the beam spot pattern on the photodetector or in the shape of the beam spot pattern. Another apparatus has been proposed which detects the defocusing state of the objective lens by a location of a beam spot pattern formed on a photodetector. In this apparatus, a laser beam for detecting the defocusing state of the objective lens is incident on the objective lens parallel to an optical axis of the objective lens and projected onto the optical disk therethrough, in addition to laser beams which are used for readout and writing of information. However, such an optical system becomes complex and the apparatus is manufactured at high cost, because the optical system having at least two optical paths for the laser beams is required. Other apparatuses are disclosed in Japanese Patent Disclosure Nos. 53-28405, 49-31128 and 53-10407, respectively. In these apparatuses, laser beams for reading out and writing information do not travel on an optical axis of an objective lens but rather travel parallel to the axis thereof. However, in these apparatuses the laser beams cannot be sufficiently converged by the objective lens, and a sufficiently small beam spot cannot be formed on the optical disk. Further, since the laser beams pass through the outer peripheral portion of the objective lens and are projected onto the optical disk, the intensity of laser beams projected onto the optical disk is decreased by eclipse.

Further, an apparatus is disclosed in Japanese Patent Disclosure No. 53-118103, in which a prism is arranged on an optical path of laser beams reflected by an optical disk. In this apparatus, the intensity of the laser beams may be attenuated when they pass through the prism, and unwanted diffraction may occur.

Although the aforementioned various drawbacks are peculiar to the optical system of an optical head, the inventor hereof has discovered that the photodetector provided in the system for detecting the defocusing state of the objective lens is also problematic In the conventional optical head, a diffraction pattern appears on the beam spot on the light receiving surface of the photodetector due to projections or recesses on the light reflecting surface and to dirt and defects on the optical disk and in the optical system. Due to the diffraction pattern the photodetector judges the objective lens as being in the defocusing state in spite of the fact that the objective lens is in the just focusing state thereby giving rise to the possibility that a focusing signal will be generated. As a result, it is not possible in the conventional optical head to correctly detect the just focusing state. In the conventional optical head, the light receiving surface is divided into several photosensitive regions, which are generally formed on the surface of a semiconductor substrate. Theoretically, only those light rays which are incident on the photosensitive regions are converted into electrons or holes in the substrate under the photosensitive regions. Practically, however, electrons or holes are produced under an intermediate region between the photosensitive regions by light rays incident on the intermediate region, and thus tend to drift to the regions under the photosensitive regions. Accordingly, the level of a signal from the photosensitive regions fails to accurately correspond to the intensity of the light rays incident on the photosensitive regions, and noise involved in the signal from the photosensitive regions are relatively high. As a result, the objective lens cannot always be maintained in the just focusing state.

SUMMARY OF THE INVENTION

It is, therefore, an object of the present invention to provide an optical system for accurately detecting the focusing state of an objective lens.

According to the present invention, there is provided a system for focusing a light beam on a light reflecting surface, which comprises an objective lens for converging the light beam, whereby a beam spot corresponding to the beam waist of the converged light beam is formed on the light reflecting surface when the objective lens is in the just focusing state. A beam spot of a larger size than that of the beam waist is formed on the light reflecting surface when the objective lens is in the defocusing state. A photodetector having a light receiving surface includes at least two photosensitive regions and a photoinsensitive region is arranged between the two photosensitive regions. Means are provided for transferring a light beam reflected from the light reflecting surface and directing the light beam toward the light receiving surface of the photodetector, whereby the light beam is projected toward the photoinsensitive region when the objective lens is in the just focusing state, and whereby the light beam is projected toward at least one of the photosensitive regions when the objective lens is in the defocusing state.

DESCRIPTION OF THE DRAWINGS

FIGS. 8, 9A, 10, 11 and 12 are schematic views of optical systems according to further embodiments of the invention;

DETAILED DESCRIPTION OF THE PREFERRED EMBODIMENTS

Figure 1:
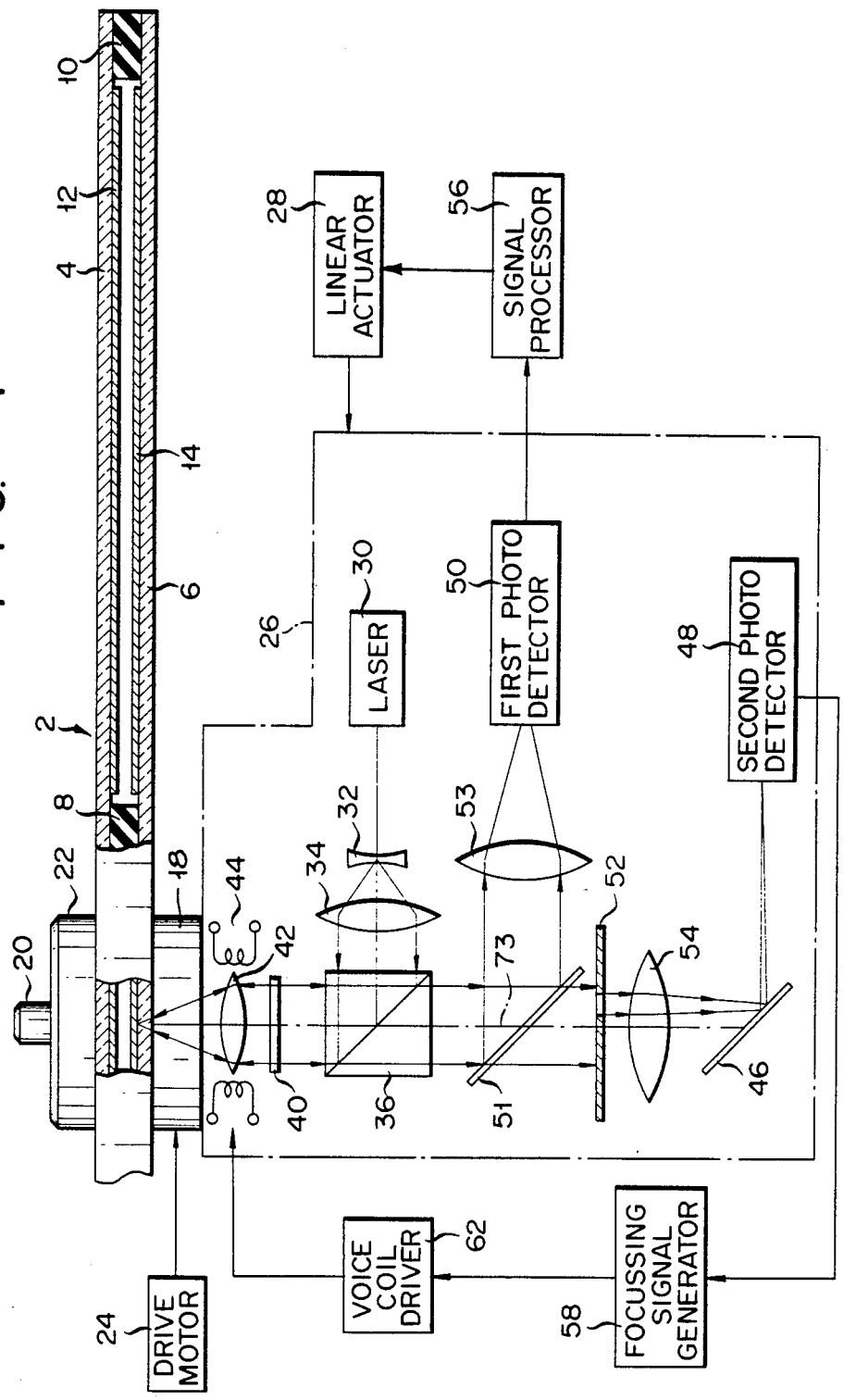
FIG. 1 is a block diagram schematically showing a system provided with an optical head according to an embodiment of the present invention.

Referring to FIG. 1, there is shown an optical system according to this invention in which information is read out from or written on an optical disk 2 as the information recording and/or reproducing medium. The optical disk 2 comprises a pair of disk-shaped transparent plates 4 and 6 which are held together through inner and outer spacers 8 and 10, as shown in FIG. 1. Light-reflecting layers 12 and 14 are deposited on inner surfaces of the transparent plates 4 and 6, respectively. Information or data is recorded in the form of pits which are formed on the light-reflecting layers 12 and 14. A through hole is formed at the center of the optical disk 2. When the optical disk 2 is placed on a turntable 18, a center spindle 20 of the turntable 18 is fitted into the through hole of the optical disk 2, such that the rotational center of the turntable 18 is aligned with that of the optical disk 2. A chucking element 22 is mounted on the spindle 20 to hold the optical disk 2 on the turntable 18. The turntable 18 is rotatably supported by a support member (not shown) and is driven at a constant speed by a drive motor 24.

The optical system shown in FIG. 1 has an optical head 26 to project laser beam onto the surface of the light-reflecting layer 14 of the optical disk 2 and to write information on or read it out from the optical disk 2. The optical head 26 is radially movable along the optical disk 2 by a linear actuator 28 and has a laser 30 for generating laser beams. For writing information on the optical disk 2, laser beam of modulated intensity is generated from the laser 30. For reading out information from the optical disk 2, laser beam having a predetermined intensity is generated from the laser 30. The laser beam generated from the laser 30 are diverged by a concave lens 32 and converted to parallel laser beam by a convex lens 34. The parallel laser beam is then reflected by a beam splitter 36 and is transmitted through a quarter wave plate 40. The laser beam is converged by an objective lens 42, and projected onto the surface of the light-reflecting layer 14 of the optical disk 2. The objective lens 42 is movably supported by voice coils 44 along an optical axis of the objective lens 42. When the focal point of the objective lens 42 is located on the surface of the light-reflecting layer 14 of the optical disk 2 by activation of the voice coils 44, a smallest beam spot corresponding to a beam waist of the laser beam is formed on the light-reflecting layer 14. Meanwhile, for writing information on the light-reflecting layer 14, pits are formed on the light-reflecting layer 14 by intensity-modulated laser beam. Information is recorded in the form of pits on the tracking guide. For reading out information from the light-reflecting layer 14, the light beam is intensity-modulated by the pits formed on the light-reflecting layer.

A laser beam reflected from the light-reflecting layer 14 is guided to the beam splitter 36 through the objective lens 42 and the quarter wave plate 40. The laser beam passes through the quarter wave plate 40 twice until it is reflected from the beam splitter 36 and is directed toward the optical disk 2, where it is reflected from the optical disk 2 and returned to the beam splitter 36. Therefore, the laser beam returned to the beam splitter 36 is half-phase retarded from the laser beam directed toward the optical disk 2. As a result, the returned laser beam is transmitted through the beam splitter 36 and is directed toward a half mirror 51. The laser beam is then split by the half mirror 51 into two beams. One of the laser beams is reflected by the half mirror 51 and is incident on a first photodetector 50 through a convex lens 53. The other laser beam is transmitted through the half mirror 51 and is directed toward a mirror 46. The laser beam is reflected by the mirror 46 and is incident on a second photodetector 48. Thus, an image corresponding to the beam spot on the light-reflecting layer 14 is formed on the second photodetector 48. A light-shielding plate 52 having an aperture and a projection lens 54 for projecting the laser beam onto the second photodetector 48 are arranged between the half mirror 51 and the mirror 46. The light shielding plate is preferably positioned at the Fourier transformer plane determined by the projection lens 54. The aperture is cut at a position away from the intersection of the plate 52 and an optical axis of the lens 56. The plate may have a slit or a knife edge, instead of an aperture. First photoelectric signals detected by the first photodetector 50 are then processed in a signal processor 56 and converted into digital information or data. The first photoelectric signals are converted into a tracking signal by the linear actuator 28 and the linear actuator 28 is actuated in accordance with the tracking signal. Thereby, the objective lens 42 is so positioned that the laser beam is projected on a tracking guide formed on the light-reflecting layer 14. A second photoelectric signal detected by the second photodetector 48 is supplied to a focusing signal generator 58 for generating a focusing signal. The focusing signal is supplied to a voice coil driver 62 to drive the voice coils 44. Thus, the objective lens 42 is moved along the optical axis thereof, and the position of the focal point of the objective lens 42 is adjusted.

In the optical head 2 described above, the beam waist of the laser beam converged by the objective lens 42 is positioned on the light-reflecting layer 14. The relative positional relationship between the objective lens 42, the projection lens 54 and the second photodetector 48 is so determined that a smallest beam spot corresponding to the beam waist is formed on the light-reflecting layer 14 and its image is formed on the light receiving surface of the second photodetector 48. As shown in FIG. 1, since the parallel laser beam is generally incident on the objective lens 42, the beam waist is formed at the focal point of the objective lens 42. When the objective lens 42 is adjusted in just focus state, a distance between the objective lens 42 and the light-reflecting layer 14 is determined to be a focal length of the objective lens 42, and the smallest beam spot is formed on the light-reflecting layer 14. The divergent laser beams reflected by the smallest beam spot at the focal point are converted to parallel laser beams by the objective lens 42 and are transmitted to the projection lens 54. The parallel beams are converged by the projection lens 54 and focused onto the focal point thereof. Therefore, the smallest beam spot image is formed at the focal point of the projection lens 54, and the light receiving surface of the second photodetector 48 is positioned at the focal point of the projection lens 54. Although parallel laser beams are transmitted to the objective lens 42 from the convex lens 34, the laser beams need not be parallel; that is slightly diverged or converged laser beams may be incident on the objective lens 42. In this case, when the beam waist is positioned on the light-reflecting layer 14 and the beam waist is formed on the light-reflecting layer, the objective lens 42 is kept in a just focusing state or an in focus state. The image of the smallest beam spot is not formed at the focal point of the projection lens 54 but near the focal point. When this occurs, the beam waist is not formed at the focal point of the objective lens 42 but is formed near the focal point.

Two photosensitive regions are formed on the light receiving surface of the first photodetector 50 shown in FIG. 1. When the laser beam spot is formed on the photosensitive regions, the intensity of the laser beam is detected to read out information or data and the diffraction pattern of the tracking guide formed in the beam spot is also detected to trace the tracking guide by the photodetector 50. The electric signals from the photodetector 50 are added and converted into information or data by the processor 56 and are compared each other and converted into the tracking signal by the linear actuator 28.

Figure 2:
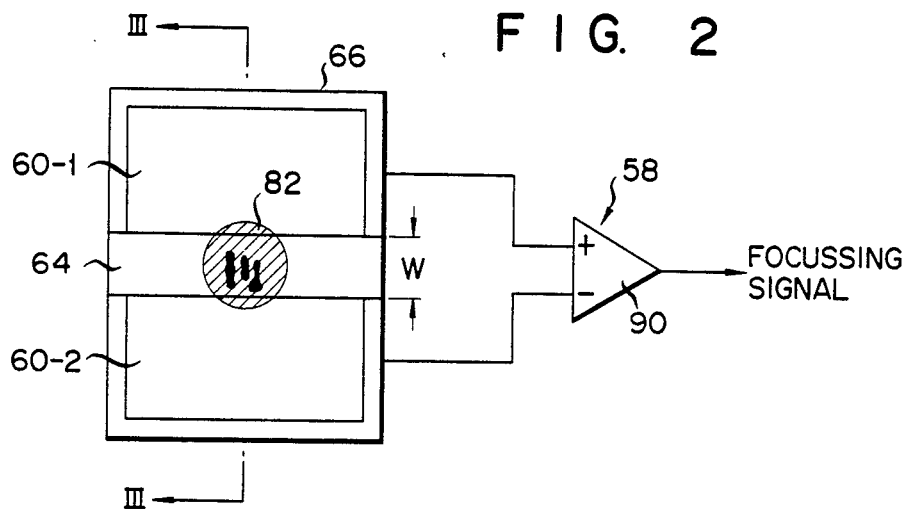
FIG. 2 is a plan view showing a light receiving surface of a photodetector shown in FIG. 1.
Figure 3:
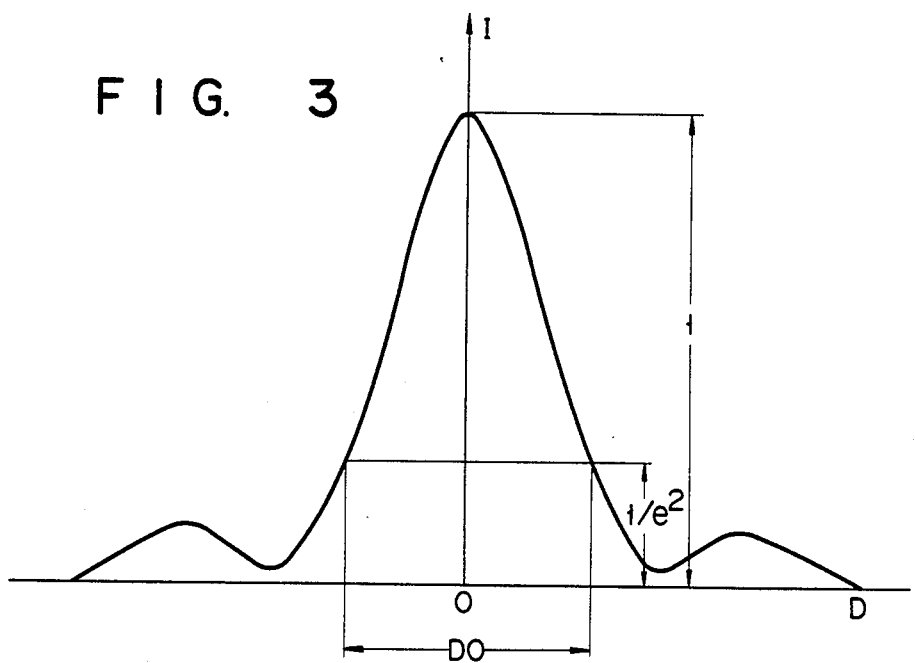
FIG. 3 is a graph illustrating the light intensity of a beam spot image formed on the light receiving surface of the photodetector.

As shown in FIG. 2, at least two photosensitive regions 60-1 and 60-2 are formed on the light receiving surface 66 of the second photodetector 48. The two photosensitive regions 60-1, 60-2 are formed between a non-photosensitive region or a photoinsensitive region 64 which senses few incident light rays or no incident light rays. The width W of the photoinsensitive region 64 between the photosensitive regions 60-1 and 60-2 is determined to be $\frac{1}{4}$ or more, preferably $\frac{1}{3}$ to 3 times, of the diameter $D_o$ of an image 82 of the beam waist formed on the light receiving surface 66 of the second photodetector 48. Here the diameter $D_o$ of the beam waist image 82 is defined as follows. FIG. 3 shows a curve representing light intensity distribution on the light receiving surface 66 of the photodetector 48. In FIG. 3, the axis of ordinate represents intensity which takes a unit value or 1 as its maximum, and the axis of abscissa represents distance D from point O corresponding to the maximum intensity. In the light intensity distribution curve of FIG. 3, the diameter $D_o$ is defined as the diameter of a region in which the intensity is $1/e^2$ or more.

Figure 4A:
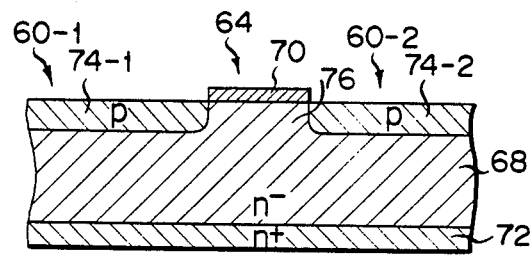
FIG. 4A is a partial sectional view taken along line III—III of FIG. 2.
Figure 4B:
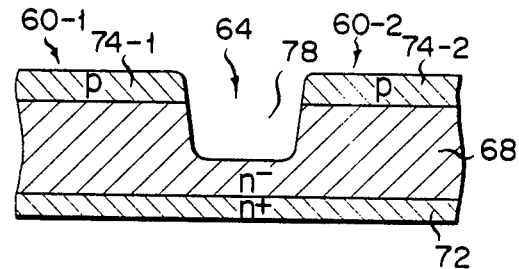
FIGS. 4B and 4C are partial sectional views of a photodetector according to another embodiments.
Figure 4C:
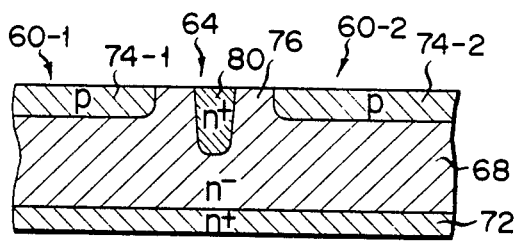

The width W of the photosensitive region is set to the above-mentioned value, taking into consideration a possible lowering of a detection sensitivity of the optical head to the defocusing state for too great a value of the width and a possible erroneous operation of the optical head for too small a value of the width. The width set normally to 1/1.5 to 1/2.0 of the beam diameter $D_o$. In a photodiode, for example, the photoinsensitive region 64 is a surface portion of a substrate between impurity regions which define the photosensitive regions 60-1, 60-2. As is generally known, when light rays are projected on the photodiode, most of electrons or holes are produced in a depletion layer in the substrate under the impurity regions, while a few holes or electrons are produced under the surface portion of the substrate between the impurity regions. If the surface portion defining the photoinsensitive region has a width W of $\frac{1}{4}$ or more of the beam diameter $D_o$, the holes or electrons produced under the surface portion is prevented from drifting into the depletion layer under the impurity regions. Therefore, noise produced in the photodiode is attenuated. As shown in FIG. 4A, an aluminum layer 70 for shielding and reflecting light rays is preferably deposited on a surface portion 76 of the substrate 68 between the two photosensitive regions 60-1 and 60-2. The photodiode shown in FIG. 4A is a PIN type, in which p-type buried regions 74-1 and 74-2 are formed in the one surface of the $n^-$-type substrate which have an $n^+$-type buried region 72 formed in the other surface thereof. If light rays are prevented by the aluminum layer 70 from penetrating into the region under the surface portion 76 of the substrate 68, as shown in FIG. 4A, then no holes or electrons will be produced under the surface portion 76, and the noise involved in the signal current from the photosensitive regions 60-1 and 60-2 will be attenuated. The noise may be attenuated in like manner by removing the surface portion 76 of the substrate 68 by etching to form a recess 78 between the photosensitive regions 60-1 and 60-2, as shown in FIG. 4B, instead of forming the aluminum layer 70 on the surface portion 76. Also, it is possible to attenuate noise by forming an $n^+$-type isolated layer 80 in the surface portion 76, as shown in FIG. 4C. In the photodiode shown in FIG. 4C, when a reverse biased voltage is applied to the $n^+$-type isolated layer 80, no depletion layer is produced under the surface portion 76, thereby holes or electrons are prevented from being drifted into the depletion layer under the p-type buried regions 74-1 and 74-2.

Figure 5:
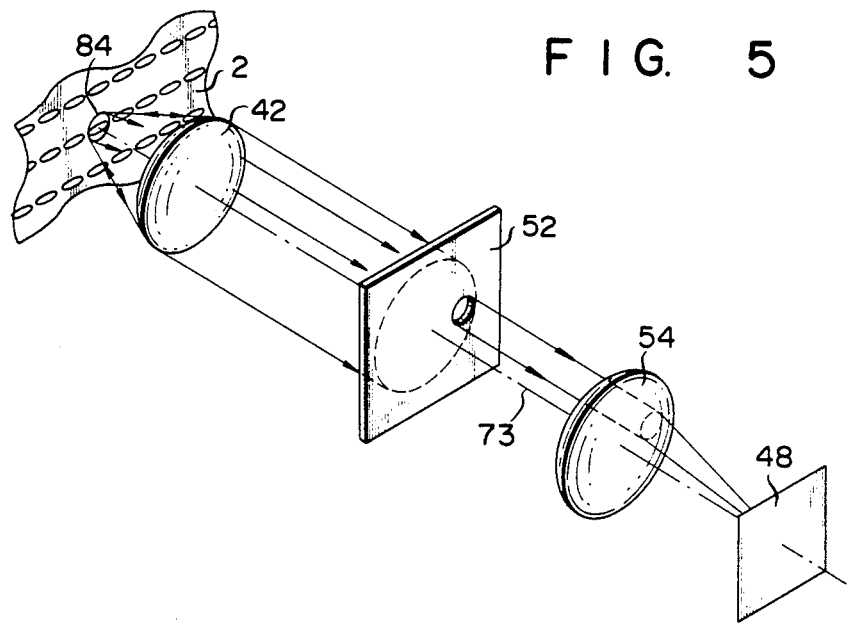
FIG. 5 is a perspective view schematically showing an optical system of the system shown in FIG. 1.
Figure 6A:
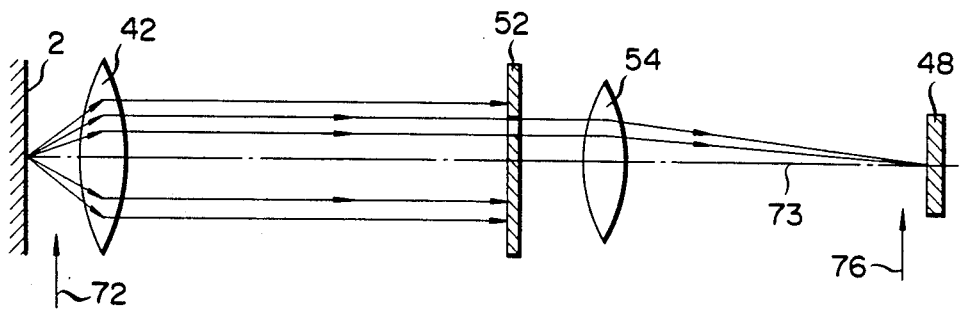
FIGS. 6A, 6B and 6C are schematic views of optical paths along which a laser beam travels when an objective lens is in the just focusing or defocusing state.
Figure 6B:
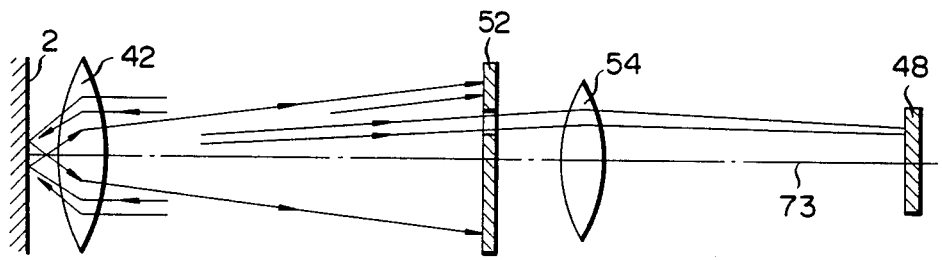
Figure 6C:
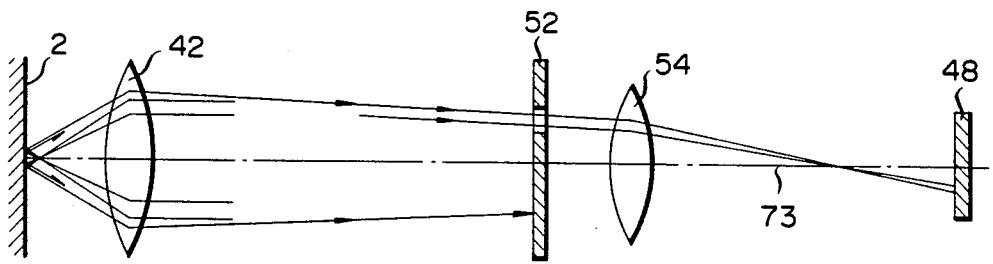
Figure 7A:
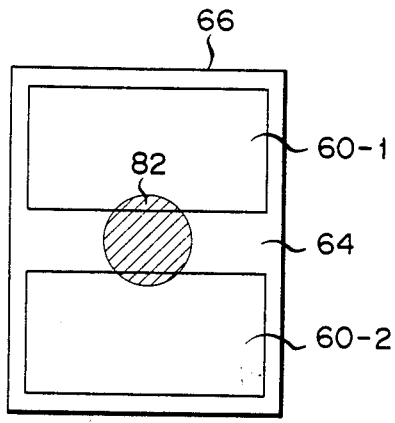
FIGS. 7A, 7B and 7C are plan views showing beam spot images and projected patterns formed on the light receiving surface of the photodetector.
Figure 13A:
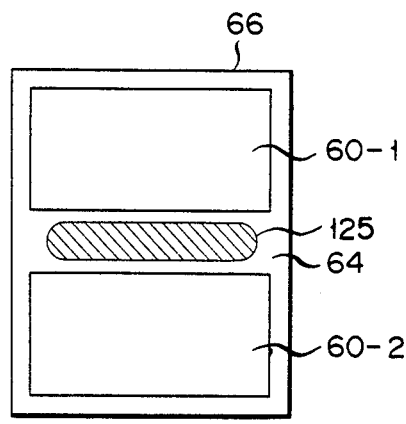
FIGS. 13A, 13B and 13C are plan views showing beam spot images and projected patterns formed on the light receiving surface of the photodetector by the optical system of FIG. 12.
Figure 13B:
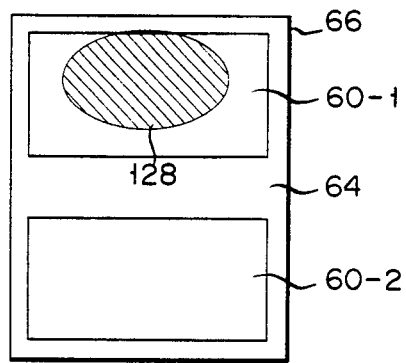
Figure 13C:
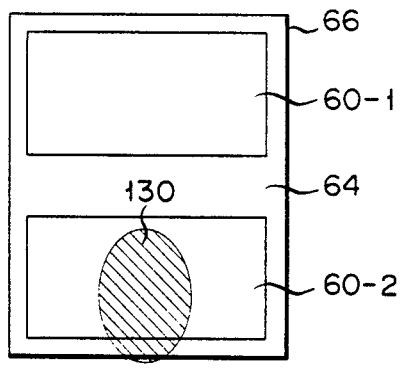

The mode of operation for determining by the optical head 26 whether the objective lens 42 is in the just focusing state or defocusing state will be described with reference to FIGS. 5, 6A, 6B and 6C. In FIGS. 5, 6A, 6B and 6C, the optical system between the optical disk 2 and the second photodetector 48 shown in FIG. 1 is simplified for illustrative convenience. If the objective lens 42 is in the just focusing state, as shown in FIGS. 5 and 6A, an image 82 of the smallest beam spot 84 corresponding to the beam waist is formed on the photoinsensitive region of the light-receiving surface, as shown in FIG. 7A, by the laser beam component passing through the light-shielding plate 52, as shown in FIG. 6B, if the objective lens 42 comes too close to the light-reflecting layer 14 of the optical disk 2, a laser beam pattern 86 projected from the projection lens 54 is formed on the photosensitive region 60-1, as shown in FIG. 4B. In other words, if the objective lens 42 comes too close to the light-reflecting layer 14, the beam waist is not formed on the light-reflecting layer 14 and a beam spot whose diameter is larger than the smallest beam spot is formed on the light-reflecting layer 14. Thus the beam waist is formed between the objective lens 42 and its focal point. Therefore, the laser beams directed from the beam waist to the objective lens 42 are converted to diverged laser beams by the objective lens 42 and are projected onto the light-shielding plate 52. Since the laser beam component passing through the light-shielding plate 52 is divergent, this component cannot be projected at the center of the light receiving surface 66 of the photodetector 48 despite being converged by the projection lens 54. The laser beam component is deviated and is projected onto the photosensitive region 60-1 to form a projected pattern 86. Conversely, as shown in FIG. 13C, if the objective lens 42 is too far away from the light-reflecting layer 14 of the optical disk 2, a laser beam pattern 88 projected through the projection lens 54 is formed on the photosensitive region 60-2. In other words, if the objective lens 42 is placed too far away from the light-reflecting layer 14, the divergent laser beam from the beam waist is incident on the light-reflecting layer 14, and a beam spot whose diameter is larger than the smallest beam spot is formed. The laser beams from this beam spot to the objective lens 42 are converted to converging laser beams by the objective lens 42 and is directed toward the light-shielding plate 52. The converging laser beams passing through the light-shielding plate 52 are converged by the projection lens 54 to form a beam waist. Thereafter, the beams are diverged again and are projected onto the photosensitive region 60-2.

Figure 7B:
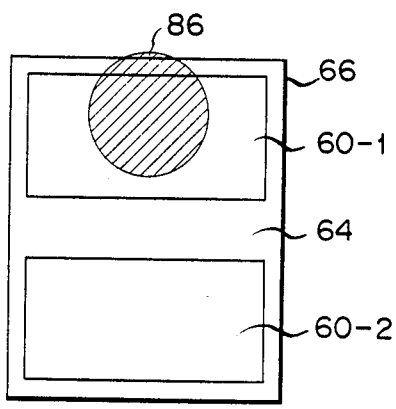
Figure 7C:
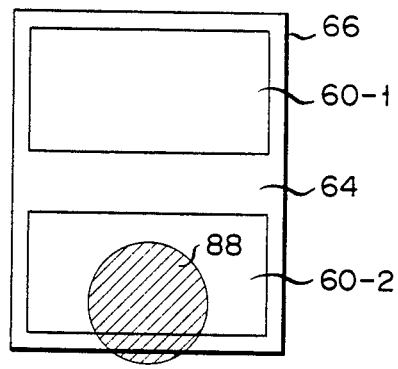

As is evident from the above description, if the objective lens 42 is in the just focusing state, the beam spot image 82 is formed on the photoinsensitive region 64, as shown in FIG. 7A. Thus, no substantial signal current is generated from the second photodetector 48, or signal currents at equal low levels are produced respectively from the two photosensitive regions 60-1 and 60-2. Accordingly, no focusing signal is delivered from a comparator 90 which is connected with the photosensitive regions 60-1 and 60-2, and the objective lens 42 is maintained in position. If the objective lens 42 is in the defocusing state, the laser beam patterns 86 and 88 are formed on the photosensitive regions 60-1 and 60-2, respectively, as shown in FIGS. 7B and 7C, and a signal current is generated from one of the photosensitive regions 60-1 and 60-2. Accordingly, a focusing signal is delivered from the comparator 90, and the objective lens 42 moved along its optical axis until the just focusing state is established.

In the above embodiment, in order to move the pattern of the laser beam projected on the light receiving surface 66 in accordance with a distance between the objective lens 42 and the light-reflecting layer 14, only part of the laser beam which pass through that area apart from the optical axis extending between the objective lens 42 and the projection lens 54 is picked up by the light-shielding plate 52. In addition to the optical system having the light-shielding plate 52 which only passes part of the laser beams, other optical systems shown in FIGS. 8, 9A, 10, 11 and 12 can change the direction of the laser beam directed from the projection lens 54 to the photodetector 48 in accordance with a distance between the objective lens 42 and the light-reflecting layer 14.

In the optical system shown in FIG. 8, an objective lens 42 and the projection lens 54 are arranged so that an optical axis 104 of the objective lens 42 crosses an optical axis 106 of the projection lens 54. The surface of the light-reflecting layer 14 is perpendicular to the optical axis 104 of the objective lens 42, while the surface of the light receiving surface 66 of the photodetector 48 is perpendicular to the optical axis 106 of the projection lens 42. The laser beams having a beam diameter corresponding to the diameter of the objective lens 42 are incident thereon along the optical axis 106 of the projection lens 54. Therefore, if the objective lens 42 is in the just focusing state, the laser beams projected through the objective lens 42 form the smallest beam spot corresponding to the beam waist on the light-reflecting layer 14. As indicated by the solid lines, the laser beams reflected by the light-reflecting layer 14 are directed toward the objective lens 42. The laser beams transmitted through the objective lens 42 are converted to parallel laser beams and converged by the projection lens 54. The converted laser beams are then projected on the light receiving surface 66 positioned on the image forming plane determined by the objective and projection lenses 42 and 54. Thus, the smallest beam spot image is formed on the light receiving surface 66. However, if the objective lens 42 is in the defocusing state, the laser beams are guided along the optical path indicated by the broken lines and the alternate long and short dashed lines, projected through the projection lens 54 and directed toward the light receiving surface 66. Therefore, the projected pattern shown in FIGS. 7B and 7C is formed on the light receiving surface 66.

Figure 9A:
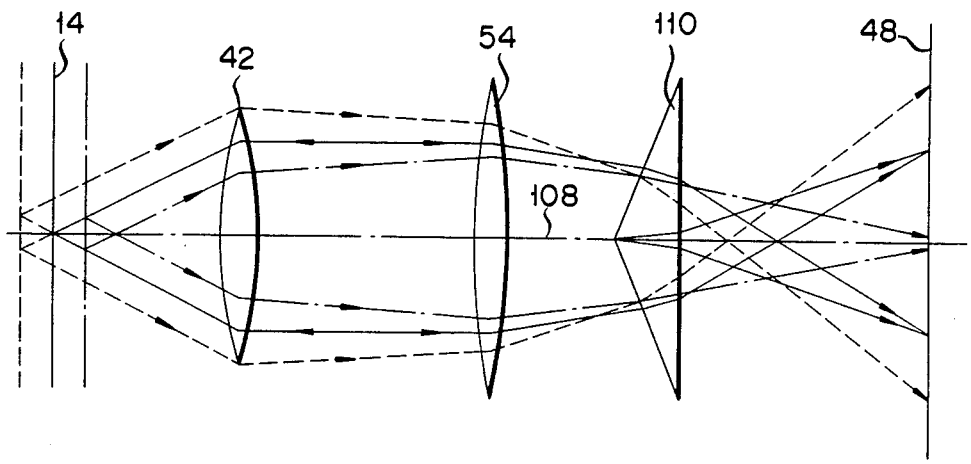
Figure 9B:
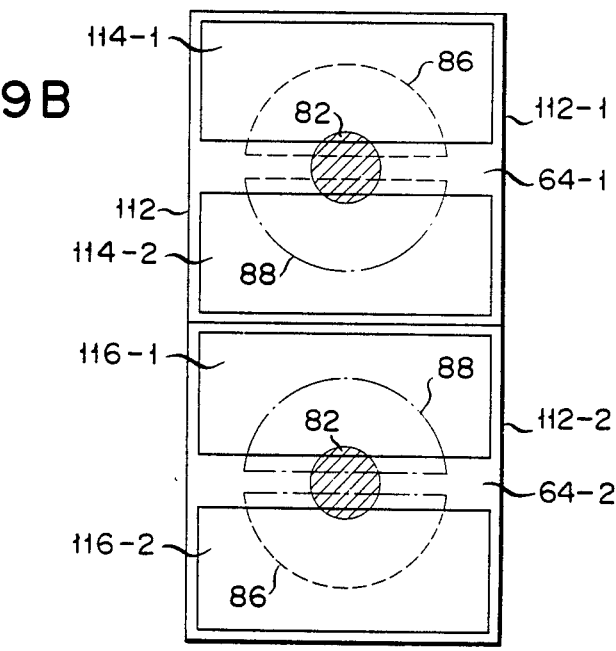
FIG. 9B is a plan view showing a light receiving surface of a photodetector shown in FIG. 9A.

In the optical system shown in FIG. 9A, the objective lens 42, the projection lens 54 and a Fresnel biprism 110 are arranged along a common optical axis 108. The light-reflecting layer 14 and a light receiving surface 112 of the photodetector 48 are perpendicular to the optical axis 108. The light receiving surface 112 is positioned on the image forming plane determined by the objective lens 42 and the projection lens 54. As shown in FIG. 9A, the light receiving surface 112 has two segment surfaces 112-1 and 112-2. The segment surfaces 112-1 and 112-2 have photosensitive regions 114-1 and 114-2, and photosensitive regions 116-1 and 116-2, respectively, in the same manner as the light receiving surface 66 shown in FIG. 7A. In the optical system shown in FIG. 9A, if the objective lens 42 is in the just focusing state, the parallel laser beam is converged by the projection lens 54 as indicated by the solid lines, and are split by the biprism 110. The split laser beams are projected on the light receiving surface 112. Therefore, as shown in FIG. 9B, the smallest beam spot images 82 are formed on the photoinsensitive regions 64-1, 64-2 of the segment surfaces 112-1 and 112-2 of the light receiving surface 66, respectively. However, if the objective lens 42 is in the defocusing state, the converged laser beam indicated by the broken lines or diverged laser beam indicated by the alternate long and short dashed lines is incident on the projection lens 54. The converged laser beam is converged by the projection lens 54, so that the beam waist thereof is formed between the biprism 110 and the light receiving surface 112. As a result, a pair of projected patterns 86 which are spaced apart are formed on the light receiving surface 112, as indicated by the broken lines. On the other hand, the diverged laser beam is converted to converged laser beam by the projection lens 54. In this case, the beam waist is not formed between the biprism 110 and the light receiving surface 112 and the laser beams are projected on the light receiving surface 112. Therefore, a pair of projected patterns 88 which are close together as indicated by the alternate long and short dashed lines are formed on the light receiving surface 112, as shown in FIG. 11B.

Figure 12:
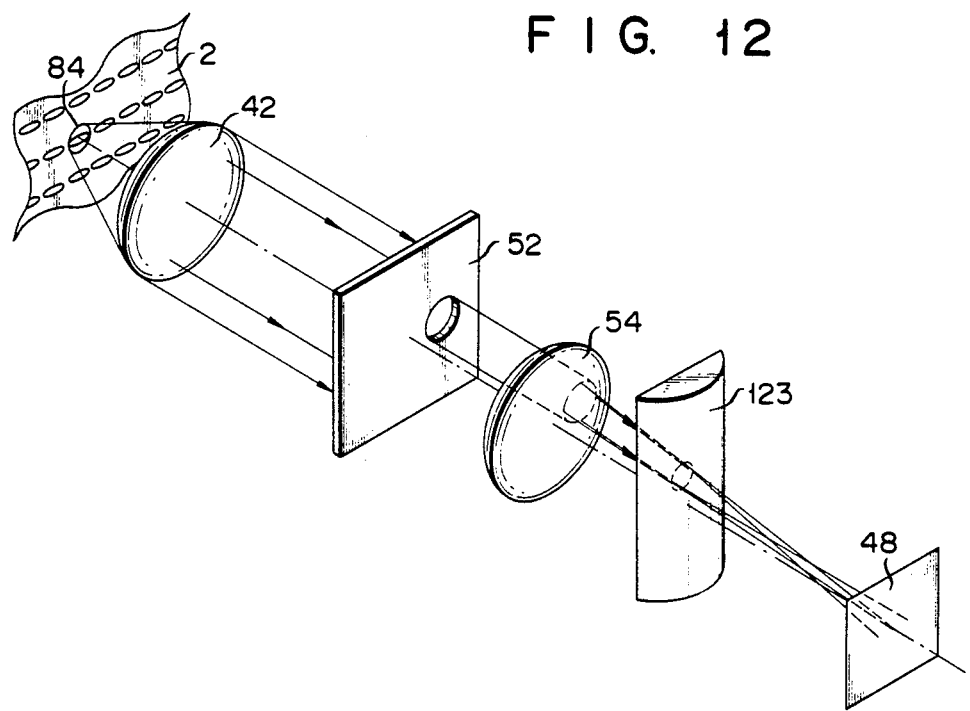

In the optical system shown in FIG. 12, a mirror 118 is arranged on the common optical axis 108 of the objective and projection lenses 42 and 54. The convergent lens 120 having an optical axis 122 is arranged between the mirror 118 and the light receiving surface 66 of the photodetector 48. The mirror 118 is arranged on the image forming point determined by the objective lens 44 and the projection lens 54 and the light receiving surface of the photodetector arranged on the optical axis 122. If the objective lens 42 is in the just focusing state, the laser beam passes through the optical path indicated by the solid lines and the smallest beam spot image is formed on the mirror 118. The smallest beam spot image on the mirror is transferred by the convergent lens 120 to the light receiving surface 66. However, if the objective lens 42 is in the defocusing state, converged laser beam indicated by the broken lines or diverged laser beam indicated by the alternate long and short dashed lines is incident on the projection lens 54 in the same manner as in the previous embodiments. These laser beams are converged by the projection lens 54 and the laser beams reflected from the mirror 118 are directed to the convergent lens 120. However, when these laser beams reflected from the mirror 118 are converged by the convergent lens 120, projection patterns shown in FIGS. 7B and 7C are formed on the light receiving surface 66 due to different traveling directions, respectively.

Figure 11:
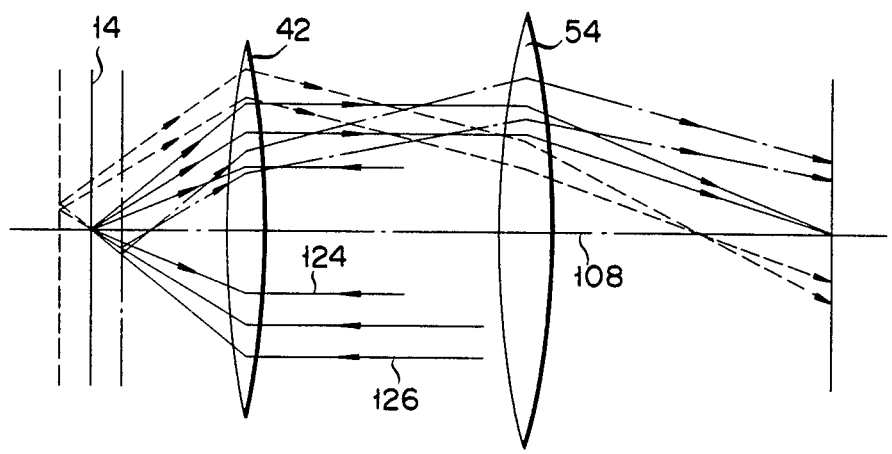

In the optical system shown in FIG. 11, the objective and projection lenses 42 and 54 are arranged on the common optical axis 108. In the optical system shown in FIG. 11, first and second laser beams 124, 126 are incident on the objective lens 42. The first laser beam 124 for recording and reproducing the information travels along the optical axis 108 and the second laser beam 126 for focusing and tracking the laser beam 124 travels along an optical path 108 which is remote from, and is parallel with the optical axis 108. On the light-reflecting layer 14, two beam spots are formed by the two beams. When the objective lens 42 is in the just focusing state, the smallest beam spots corresponding to the beam waists of the two laser beams 124, 126 are formed on the light-reflecting layer 14. Therefore, the first and second laser beams 124, 126 indicated by the solid line form the image of the smallest beam spots on the photoinsensitive region 62 of the light receiving surface 66 of the photodetector 48. When the objective lens 42 is in the defocusing state, the beam spot larger than the smallest beam spots is formed on the light receiving surface 66. The first laser beam 124 forms the projected pattern on the center region of the light receiving surface 66, but the second laser beam 126 passing through the optical paths indicated by the broken line or the alternate long and short dashed line is deviated on the light receiving surface 66 and forms the projected pattern on the upper or lower regions of the light receiving surface 66. Therefore, the optical system shown in FIG. 11 can detect the focusing state of the objective lens.

In the embodiments shown in FIGS. 8, 9A, 10, 11 and 12 the laser beams traveling toward the objective lens 42 are parallel laser beams. However, converged or diverged laser beams may be used to detect the focusing state of the objective lens in the same manner as in the optical system indicated in FIG. 1.

As shown in FIG. 12, moreover, a cylindrical lens 123 may be added to the optical system shown in FIG. 5. The cylindrical lens 123 is arranged between the projection lens 54 and the photodetector 48. When the objective lens 42 is in the just focusing state, the light receiving surface of the photodetector 48 is on one of two image forming planes defined by the objective lens 42, the projection lens 54, and the cylindrical lens 123. While the objective lens 42 is in the just focusing state, therefore, the laser beam travels along an optical path indicated by the solid lines in FIG. 12 to be projected on the light receiving surface 66 of the photodetector 48. Thus, a beam spot image 123 as shown in FIG. 13A is formed on the photoinsensitive region 64. When the objective lens 42 is in the defocusing state, one of laser projected patterns 128 and 130 is formed on one of the photosensitive regions 60-1 and 60-2 of the light receiving surface 66 of the photodetector 48, as shown in FIG. 13B or 13C. Not only in the optical system shown in FIG. 5, but also in the optical systems shown in FIGS. 8, 9A, 10 and 11, the cylindrical lens 125 may be arranged between the projection lens 54 and the photodetector 48. The addition of the cylindrical lens 125 to the optical system leads to an improvement in sensitivity of the system itself.

Figure 14A:
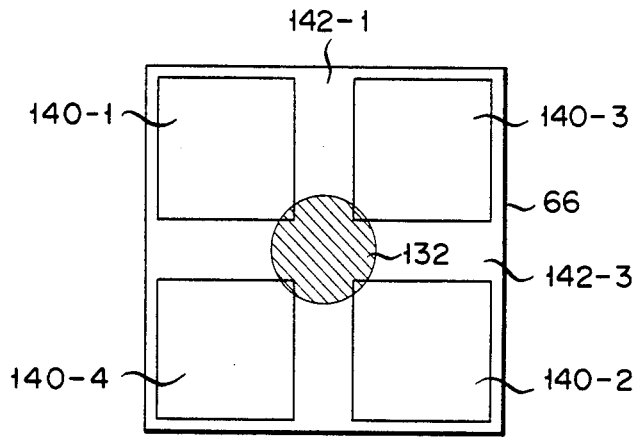
FIGS. 14A and 14b are plan views showing projected patterns formed on the light receiving surface of the photodetector by the optical system of the another embodiment of the invention.
Figure 14B:
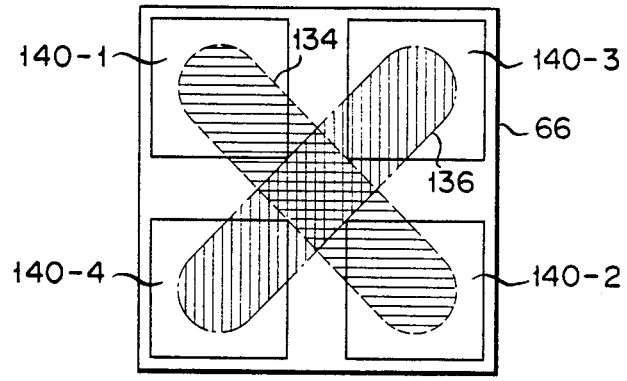

It is to be understood that the photodetector with the photoinsensitive region of the present invention is not limited to the use with the above-mentioned various optical systems, and may be also applied to those optical systems which are disclosed in U.S. Pat. Nos. 4,079,247 and 4,079,248. In the optical system utilizing an astigmatism which is disclosed in U.S. Pat. No. 4,079,247, a spot corresponding to the state of the objective lens is formed on the light receiving surface 66 of the photodetector by a laser beam projected from a cylindrical lens. With the objective lens in the just focusing state a circular spot 132 is formed on the light receiving surface 66 as shown in FIG. 14A and with the objective lens in the defocusing state any one of elongated spots 134, 136 is formed as shown in FIG. 14B. The light receiving surface 66 includes four photosensitive regions 140-1, 140-2, 140-3 and 140-4 and photoinsensitive regions 142-1 and 142-2 substantially insensitive to light rays as already mentioned above. With the objective lens in the just focusing state a circular spot 132 is formed on the insensitive regions 142-1 and 142-2, thus producing almost no current signal from the photodetector. With the objective lens in the defocusing state one of the elongated spots 134, 136 is formed on one of pairs photosensitive regions 140-1, 140-2 and 140-3, 140-4, the apparatus can accurately detect the just focusing state or the defocusing state in the same way as in the above-mentioned embodiment. For a detailed configuration of the photosensitive region and detailed arrangement of the optical system reference the reader's attention is invited to U.S. Pat. No. 4,079,247.

According to the present invention, the photodetector 48 is provided with at least a pair of photosensitive regions 60-1, 60-2 and a photoinsensitive region 64 between the photosensitive regions 60-1, 60-2, and a laser beam is projected toward the photoinsensitive region 64 when the objective lens 42 is in the just focusing state. Therefore, even if a diffraction pattern 150 shown in FIG. 2 is formed in a beam pattern or image projected on the light receiving surface of the photodetector 48 due to ruggedness of a light-reflecting layer 14 or defective parts or dust in an optical system, optical head 26 can accurately detect the focal condition of the objective lens 42. As mentioned before, moreover, the level of noise involved in the signal current generated from the two photosensitive regions 60-1, 60-2 of the photodetector 48 can be lowered. Further, the ratio of the signal current from the photodetector 48 obtained when the objective lens 42 is in the defocusing state to the signal current obtained when the objective lens is in the just focusing state may be increased, so that S/N ration of the focusing signal can be improved and the objective lens 42 can be adjusted to the just focusing state with accuracy and speed. Furthermore, the positioning of the photodetector 48 is facilitated since it may be arranged on the image forming plane by only locating its light receiving surface 66 in the position where the signal currents from the two photosensitive regions 60-1, 60-2 of the photodetector 48 is the smallest.

What is claimed is:

1. A system for focusing a light beam on a light reflecting surface, comprising:
   an objective lens for converging the light beam whereby a beam spot corresponding to the beam waist of the converged light beam is formed on the light reflecting surface when the objective lens is in the just focusing state, and whereby a beam spot of a larger size than that of the beam waist is formed on defocusing state;
   a photodetector having a light receiving surface including at least two photosensitive regions and a photoinsensitive region arranged between the two photosensitive regions and detecting no substantial light rays; and
   means for transferring a light beam reflected from the light reflecting surface and directing the light beam toward the light receiving surface of the photodetector, whereby the light beam is projected toward the photoinsensitive region when the light beam is projected toward at least one of the photosensitive regions when the objective lens is in the defocusing state, wherein
   said transfer means includes a projection lens for directing the light beam toward the light receiving surface of the photodetector and means for deflecting the light beam in accordance with the distance between the objective lens and the light reflecting surface, and the light receiving surface of the photodetector is arranged on an image forming plane on which an image of the beam spot corresponding to the beam waist is formed by the objective lens and the projection lens when the objective lens is in the just focusing state, and wherein
   said means for deflecting the light beam is a light shielding plate to transmit light beams passing through only those areas which are off the optical axis of the projection lens.

2. The system according to claim 1, wherein said photoinsensitive region is a light-shielding layer to shield light rays.

3. The system according to claim 2, wherein said light-shielding layer is an alumina layer.

4. The system according to claim 1, wherein said photodetector is a semiconductor photodetector, and said photoinsensitive region is a recess region formed in the semiconductor photodetector.

5. The system according to claim 1, wherein said photodetector is formed on a semiconductor substrate, and said photoinsensitive region is an impurity region of the same conductivity type as the substrate having a higher impurity density than that of the substrate.

6. The system according to claim 1, wherein the width of said photoinsensitive region is a quarter or more of the diameter of the beam spot formed on the light receiving surface by the projection of the light beam when the objective lens is in the just focusing state, the diameter of the beam spot being defined as the diameter of the region in which the intensity of the beam spot has a maximum, $1/e^2$.

7. The system according to claim 6, wherein the width of said photoinsensitive region ranges from ⅓ to 3 times the diameter of the beam spot.

8. The system according to claim 1, wherein said transfer means includes a cylindrical lens arranged between the projection lens and the photodetector.

9. The system according to claim 1 wherein said light shielding plate is disposed between said objective lens and said projection lens.

10. A system for focusing a light beam on a light reflecting surface, comprising:
    an objective lens for converging the light beam, whereby light beam is formed on the light reflecting surface when the objective lens is in the just focusing state, and whereby a beam spot of a larger size than that of the beam waist is formed on the light reflecting surface when the objective lens is in the defocusing state;
    a photodetector having a light receiving surface including at least two photosensitive regions and a photoinsensitive region arranged between the two photosensitive regions and detecting no substantial light rays; and
    means for transferring a light beam reflected from the light reflecting surface and directing the light beam toward the light receiving surface of the photodetector, whereby the light beam is projected toward at least one of the photosensitive regions when the objective lens is in the defocusing state, wherein
    said transfer means includes projection lens means for directing the light beam toward the light receiving surface of the photodetector and means for deflecting the light beam in accordance with the distance between the objective lens and the light reflecting surface, and the light receiving surface of the photodetector is substantially arranged on an image forming plane on which an image of the beam spot corresponding to the beam waist is formed by the objective lens and the projection lens when the objective lens is in the just focusing state, and wherein
    said means for deflecting the light beam includes means for generating a light beam passing parallel to the optical axis of the objective lens.

11. The system according to claim 10 wherein said means for generating a light beam passing parallel to the optical axis of the objective lens is disposed between said objective lens and said projection lens.

12. The system according to claim 10, wherein said projection lens means includes first and second projection lenses and wherein said transfer means further includes a mirror, so that an image of the beam spot corresponding to the beam waist is formed on the mirror by the objective lens and the first projection lens when the objective lens is in the just focusing state, and that the image on the mirror is transferred onto the light receiving surface of the photodetector by the second projection lens.

13. The system according to claim 10 wherein said light beam generating means generates a light beam passing parallel to the optical axis of the objective lens through an area arranged off the optical axis.

* * * * *